United States Patent [19]

Dukas et al.

[11] Patent Number: 6,003,545
[45] Date of Patent: Dec. 21, 1999

[54] GAS FLOW CONTROL DEVICE FOR HIGH PURITY, HIGHLY CORROSIVE GAS SERVICE

[75] Inventors: Sande Dukas, Virginia Beach; Kevin Bailey, Portsmouth; John Friedrichs, Virginia Beach; Robert Cooper, Virginia Beach; David Durkin, Virginia Beach, all of Va.

[73] Assignee: Controls Corporation of America, Virginia Beach, Va.

[21] Appl. No.: 08/892,882

[22] Filed: Jul. 15, 1997

Related U.S. Application Data

[60] Provisional application No. 60/021,809, Jul. 16, 1996.

[51] Int. Cl.⁶ .................................................. G05D 16/06
[52] U.S. Cl. .................. 137/505; 137/375; 137/505.42; 137/557
[58] Field of Search .................................... 137/375, 505, 137/505.38, 505.41, 505.42, 557

[56] References Cited

U.S. PATENT DOCUMENTS

| | | | |
|---|---|---|---|
| 3,334,650 | 8/1967 | Lowrey et al. ......................... | 137/375 |
| 4,136,709 | 1/1979 | Rogers et al. ......................... | 137/375 |
| 4,161,187 | 7/1979 | Bauer ..................................... | 137/375 |
| 4,840,195 | 6/1989 | Zabrenski . | |
| 4,869,301 | 9/1989 | Ohmi et al. . | |
| 4,917,136 | 4/1990 | Ohmi et al. . | |
| 5,086,807 | 2/1992 | Lasnier et al. ................. | 137/505.42 X |
| 5,141,022 | 8/1992 | Black . | |
| 5,285,810 | 2/1994 | Gotthelf . | |
| 5,303,733 | 4/1994 | Nelson . | |
| 5,492,146 | 2/1996 | George et al. . | |
| 5,520,213 | 5/1996 | Miller . | |

*Primary Examiner*—Stephen M. Hepperle
*Attorney, Agent, or Firm*—Kerkam, Stowell, Kondracki & Clarke, P.C.; John C. Kerins; Edward J. Kondracki

[57] ABSTRACT

A gas flow control device is provided in which a regulator body has an inlet bore and an outlet bore extending therein, into which inlet and outlet sleeves having highly polished inner surfaces are secured, with the inlet and outlet sleeves further having connected thereto, at an exterior of the regulator body, connectors for an inlet line, an inlet pressure gauge, an outlet line and and outlet pressure gauge. The inlet and outlet sleeves are made of corrosion-resistant tubing, as are the connectors, in a preferred embodiment.

12 Claims, 3 Drawing Sheets

GAS FLOW CONTROL DEVICE FOR HIGH PURITY, HIGHLY CORROSIVE GAS SERVICE

This application is directed to an invention that has been described and depicted in U.S. Provisional Application Serial No. 60/021,809, filed Jul. 16, 1996.

BACKGROUND OF THE INVENTION

1. Field of the Invention

The present invention relates to gas flow control devices, and more particularly to pressure regulators that are suitable for use in service with highly pure and highly corrosive gases.

2. Description of Related Art

The demands on gas delivery systems in the semiconductor fabrication industry have made the design of gas flow control devices in general, and of pressure regulators in particular, especially challenging. The gases used must be of ultrahigh purity in order to avoid contamination of the devices undergoing fabrication. At the same time, the gases commonly used in semiconductor fabrication are highly corrosive, thus requiring the wetted surfaces, i.e., surfaces that will contact the flowing gases, to be made of expensive corrosion-resistant metals, such as stainless steel, and to be highly polished or otherwise treated to achieve the necessary degree of smoothness to substantially prevent erosion-corrosion of the metal surface. As used herein, the term polished is intended to refer to any process or treatment for increasing the smoothness of a surface, and is not limited to specific polishing techniques, such as mechanical polishing. In addition, the term polished may also refer to the state of smoothness of the internal surface of an as-drawn section of tubing, if the drawing process is conducted so as to yield a very smooth surface.

Furthermore, current designs necessitate the use of intersecting bores within the device body, in order to achieve the correct flow of gases. The resultant internal angles, in the form of internal tees and elbows, provide sources for increased contamination in a high-purity and/or corrosive gas stream. The proposed design eliminates these internal angular passages, thereby reducing the possibilities of contaminating the gases flowing through the device.

In addition, while threaded connections between the body of the regulator and the inlet, outlet, and gauge connectors or fittings are generally preferred for economy of manufacture and assembly, in this high purity, high corrosivity gas service, it is desirable, where possible, to avoid having threaded connections exposed to the gas stream. This has led in the past to fabricating the regulator body from barstock of expensive, corrosion-resistant materials, wherein the regulator body is machined and drilled to form the necessary passages. The passages must then be polished to achieve the necessary smooth finish as discussed above, and the connectors, generally VCR® or other brands of metal-to-metal face seal connectors, are butt welded to the regulator body. VCR® is a registered trademark of Swagelok Co., for connectors or couplings of the type used in ultrahigh purity gas service.

These regulator designs, while providing good performance in their use in semiconductor fabrication gas service, are expensive to manufacture, and have other disadvantages including the inherent inflexibility of the solid barstock body design in configuring or orienting the inlets and/or outlets in different positions, or in altering what is referred to as the face-to-face dimension, to accommodate different end uses or end users' preferences.

Other gas flow control devices, such as diaphragm valves and flow meters, are also difficult and expensive to manufacture for use with high purity and/or highly corrosive gases, particularly in providing the smoothest possible surfaces for the gas flow passages.

It is therefore a principal object of the present invention to provide a gas flow control device, and, in particular, a pressure regulator that will provide all of the desirable features of the existing regulators in use in high purity, high corrosivity gas service.

It is a further principal object of the present invention to provide a pressure regulator that will have design flexibilities not attainable in the solid barstock body regulators presently used in the high purity, high corrosivity gas service.

It is a further important object of the present invention to provide a pressure regulator for use in high purity and/or high corrosivity gas service that has no threaded connections exposed to the gas stream, and avoids the use of gaskets in making the seals and connections.

Further important objects of the present invention are to provide a pressure regulator for use in high purity, highly corrosive gas service that has a low dead volume, and one which allows for simple maintenance and repair of the regulator. Dead volume is internal volume that has little or no fluid circulation through it.

SUMMARY OF THE INVENTION

The above and other objects of the present invention are achieved in the present invention by providing a pressure regulator having a regulator body that is not fabricated substantially solely by machining, drilling and tapping barstock material to form inlet and outlet passages, but is instead made up of components that are assembled to a central body to achieve the necessary configuration. In addition, the expensive and difficult process of polishing the wetted surfaces of the regulator body is avoided, on the one hand, by using an assembly of pre-polished, essentially off the shelf tubing and fitting components for the inlet and outlet passageways or ports, and for the inlet and outlet pressure gauge ports.

The central regulator body will have passages in fluid communication with the internal components that actually effect the pressure regulation, and those passages are drilled through the central regulator body. Instead of drilling and then polishing the actual passages for use as the wetted surfaces, the passages will be drilled oversized and will be fitted with essentially off-the-shelf inner sleeves or ferrules that have highly polished interior surfaces. Thus, the central regulator body as a whole need not be polished, and need not be made of a special corrosion resistant material, such as 316L VAR stainless steel. The central regulator body may be made of a standard carbon steel, for example, which would not generally have good corrosion resistance in high purity and/or highly corrosive gas service.

The avoidance of exposure to the gas stream of threaded connections is achieved through the use of three way metal tubing tee fittings that allow the connections for the inlet, the outlet, the inlet pressure gauge port, and the outlet pressure gauge port, to be made generally by welding sections of tubing to the sleeves extending into the regulator body, wherein the sections of tubing joined to the tees are provided with VCR® connectors at their extremities. The three way tee fittings further permit the use of traditional inlet and outlet port orientations or layouts, while, at the same time, and using an identical central regulator body, permit the construction of regulators having other inlet/outlet port layouts.

The avoidance, in the present invention, of having to drill and tap (as applicable) the regulator body itself to provide the four or six ports commonly found on regulators of this type also permits a reduction in, and/or customization of, what is referred to as a face-to-face dimension, or the distance between the extremities of the inlet and outlet ports or lines.

BRIEF DESCRIPTION OF THE DRAWINGS

These and other features of the present invention and the attendant advantages will be readily apparent to those having ordinary skill in the art. The invention will be more easily understood from the following detailed description of the preferred embodiment taken in conjunction with the accompanying drawings wherein like reference characters represent like parts throughout the several views.

DETAILED DESCRIPTION OF THE PREFERRED EMBODIMENT

Figure 1:
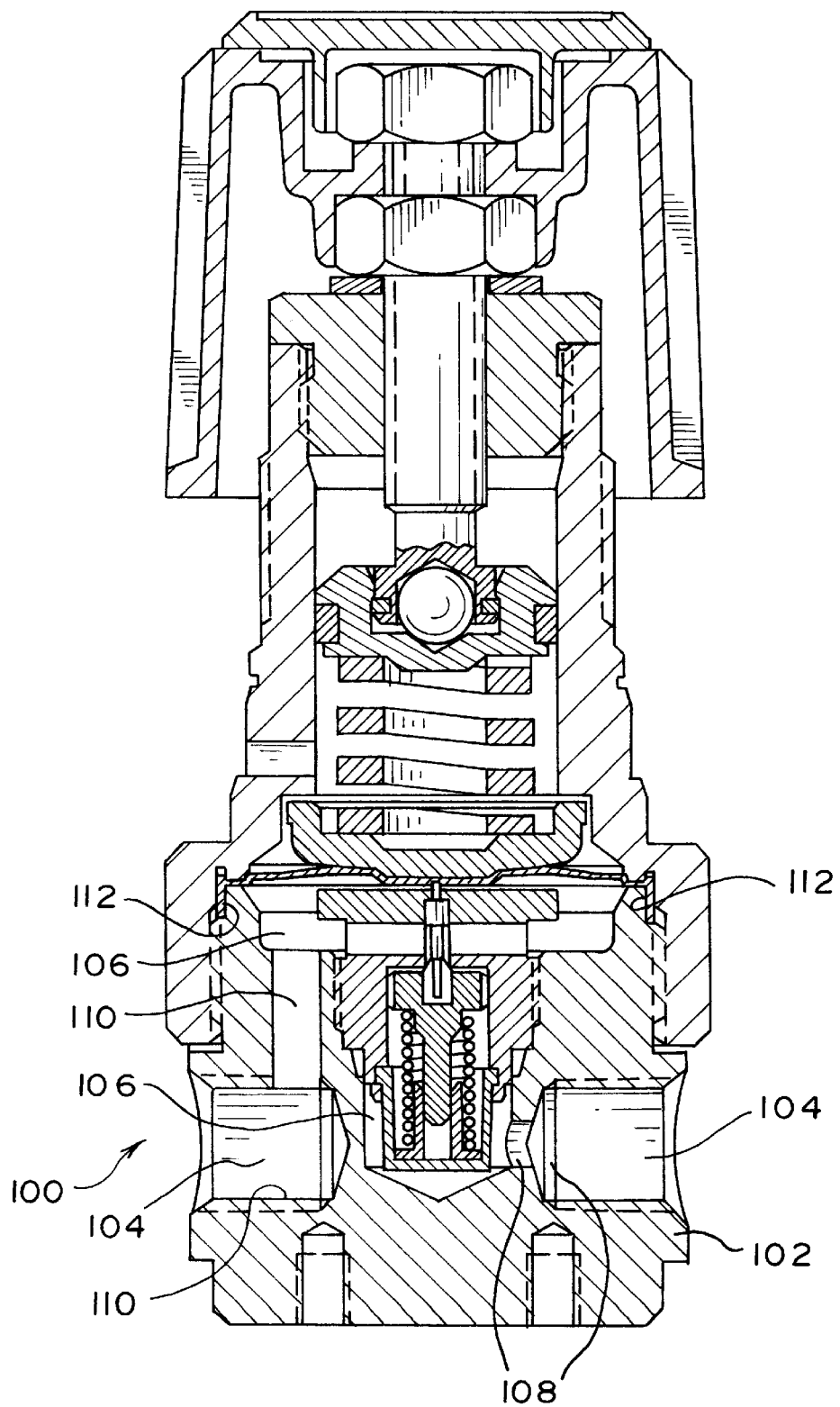
FIG. 1 is a cross-sectional view of an example of a single-stage regulator that has heretofore been employed in the type of gas service to which the present invention is directed.

Turning initially to FIG. 1, a pressure regulator 100 of a type heretofore used in highly corrosive and high purity gas services is depicted in cross-section. The regulator body 102 is generally a solid mass of metal, stainless steel being a preferred material for use in certain corrosive environments.

A plurality of bores, passages and/or seating surfaces are formed by drilling into the solid mass, and by tapping the bores and/or passages, where appropriate. Notably, either four or six ports 104 (two shown) are formed in the lower portion of the regulator body 102 for a gas inlet, a gas outlet, an inlet pressure gauge, an outlet pressure gauge, and the like. In addition, a central portion 106 of the regulator body is bored or otherwise formed, to receive the internal components that operate to regulate the gas pressure.

All of the passages that are contacted by, or, as the term is used in the art, wetted by, the flowing gas, including the surfaces of the inlet and outlet passages 108, 110, respectively, must be highly polished in order to be acceptable for use with high purity gases and/or with highly corrosive gases. This is a very costly and very difficult procedure particularly where the interior surfaces of the passages have complex shapes, and where the passages are not straight runs, but instead change direction.

Most commonly, pressure regulators of this type have a standard port configuration wherein the inlet port and outlet port are diametrically opposed, as, for example, at the "3 o'clock" and "9 o'clock" positions on a clock face. With the inlet and outlet ports so oriented, inlet and outlet. pressure gauge ports are provided at the "1 o'clock" and at "10:30" positions, respectively. Because these ports are bored directly into the regulator body, it is expensive to obtain regulators having a different port layout or orientation, because the regulator bodies bored for the standard configuration generally cannot be used, and regulator body blanks will have to be specially bored to obtain the desired port layout. Further, depending upon how different the desired non-standard port layout is to be, it might even be necessary to start from a custom-made body blank, in that wall thicknesses may have to be varied to accommodate the pressures of the gases in the different configurations.

Figure 2:
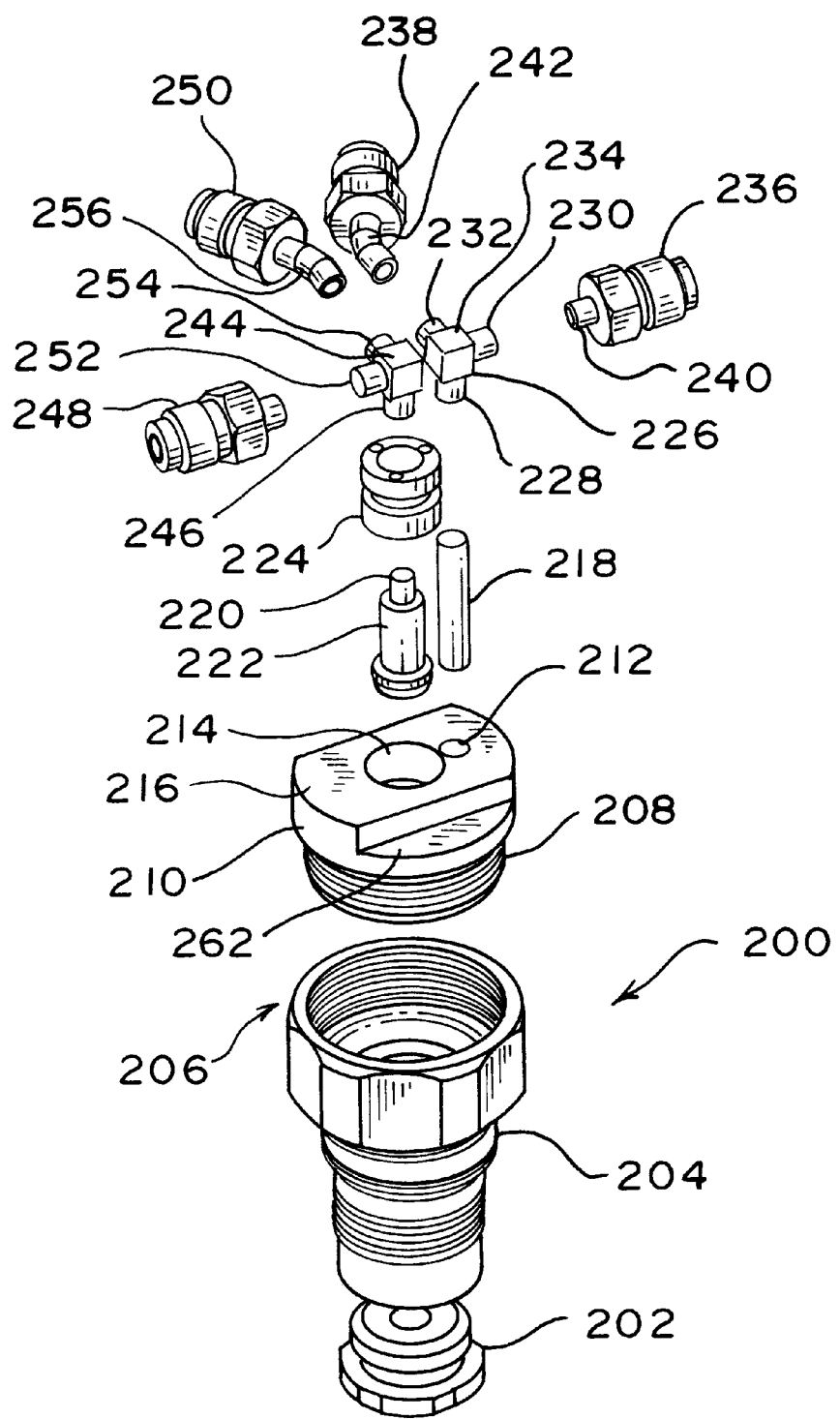
FIG. 2 is an exploded perspective view of the case, central regulator body, and gas passage components of the regulator according to a preferred embodiment of the present invention.
Figure 3:
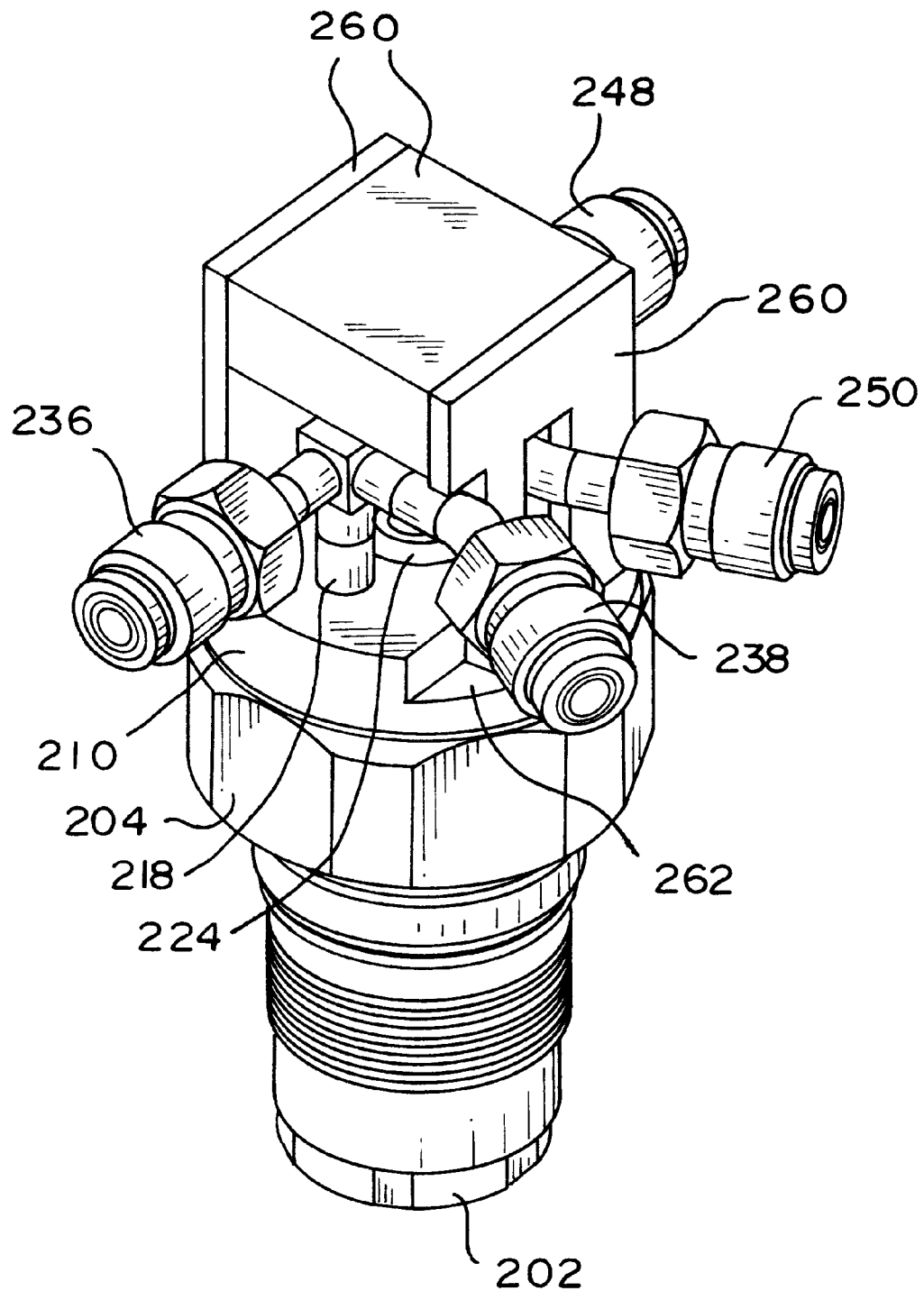
FIG. 3 is a perspective view of an assembled regulator according to a preferred embodiment of the present invention.

Turning now to FIGS. 2 and 3 a regulator 200 in accordance with the present invention is depicted in an exploded view. The regulator 200 employs a substantially standard bonnet cap 202 and bonnet/case 204 of the same type as that depicted in FIG. 1. The end of the bonnet/case 204 opposite the end at which the bonnet cap 202 is disposed, hereafter referred to as the lower end 206 of the bonnet/case, is internally threaded to engage outer threads 208 on a central regulator body 210. This threaded connection, as is the comparable threaded connection in the FIG. 1 regulator, is isolated from the gas flow by a gasket or seal (not shown in FIG. 2, element 112, in FIG. 1), once the regulator is assembled into its final configuration.

The central regulator body 210, instead of having four or six bores drilled radially from the circumference of the body, has two bores 212, 214, extending through the body from a lower, substantially planar, bottom surface 21.6 of the body. The bores 212, 214, have a larger diameter than the diameter of the gas lines to be used with the regulator 200. Outlet bore 212 is sized to receive therein an outlet ferrule or sleeve 218 of the desired corrosion resistant material. The outlet sleeve is press fit or welded so as to be permanently secured in the outlet bore 212, and, once installed, will project a short distance out of the bottom surface 216 of the body (see FIG. 3).

One of the principal advantageous features of the present invention is that the internal surfaces of the bores in the regulator body 210, outlet bore 212 being an example, need not be polished to provide the highly smooth wetted surface necessary for handling high purity, highly corrosive gases. Instead, outlet sleeve 218 is provided with the necessary highly polished inner surface. It will be appreciated that the polishing of the interior surface of a length of tubing used to make sleeves such as sleeve 218 is much easier to accomplish than is polishing of internal surfaces of an irregularly shaped regulator body. Indeed, the present invention capitalizes on the use of highly efficient and effective polishing techniques and technologies developed for other industries, for example, the hypodermic needle industry.

Further, the stainless steel tubing available for use in the present invention has a smaller grain size than that of the prior art regulator bodies that have passages bored therethrough. This smaller grain size yields a better surface finish than the machined and polished surface of the regulator body, which results in a reduction in moisture or other contaminants collecting on and/or being released from the wetted surfaces of the regulator device.

Inlet bore 214 in the regulator body 210 is of greater initial diameter than is outlet bore 212. At the inlet side of the regulator, inlet sleeve 220, having a highly polished internal surface, is positioned within an inlet seating fitting 222, secured by press fit or welding. The seating fitting itself is sized to fit within a throughbore extending through inlet base plug 224. The inlet base plug is inserted into, and is permanently secured in, the regulator body 210 within inlet bore 214. All wetted surfaces of the inlet assembly are highly polished in order to be acceptable for the high purity, highly corrosive gas service.

Once the outlet sleeve 218 has been secured in outlet bore 212, and once the inlet assembly components are secured within inlet bore 214, the bottom planar surface 216 of the body will have stub portions of the inlet and outlet sleeves, 220, 218, respectively, projecting outwardly therefrom. Outlet sleeve 218 will have welded thereto one tubular branch 228 of an outlet tee 226. As depicted, outlet tee 226 has two further tubular branches 230, 232, with all three tubular branches being joined, as shown, at mutual right angle relationships, by means of the tee junction box 234.

Joined to the two remaining outlet tubular branches, as by butt weldings, are VCR connections 236, 238 that will permit an outlet line and an outlet pressure gauge to be connected thereto. Given that the regulator 200, as illustrated, adopts the standard port orientation, the VCR connector 236 that will connect to the outlet line (not shown), employs a straight length of internally polished tubing 240 connected to tubular branch 230. The VCR connector 238 to which the outlet pressure gauge (not shown) will connect, is attached to tubular branch 232 by an elbow member 242, which can be fabricated from short sections of internally polished tubing.

The inlet is configured substantially the same way as is the outlet. One branch 246 of an inlet tee 244 is welded to inlet sleeve 220, and VCR connectors 248, 250 are connected, as by welding, to the two remaining branches 252, 254. As on the outlet side, the gas inlet line (not shown) will preferably be connected to VCR connector 248, which itself is connected with straight tubing to inlet tubular branch 252, which branch is positioned diametrically opposite tubular branch 230. The inlet pressure gauge (not shown) is preferably to be connected to VCR connector 250 which has an elbow tubular connection 256 secured to tubular branch 254.

It will be readily appreciated that the orientation of some or all of the inlet and outlet connectors can readily be varied without any modification to the regulator body 210 being necessary, simply by reconfiguring the connections, as by rotating the tees or providing elbows of different configurations. Further, it can be seen that the face-to-face distance, i.e., the distance between the inlet and outlet lines can be minimized, or, if desired, customized to a desired larger spacing.

FIG. 3 shows the regulator 200 as completely assembled, with the VCR connectors 236, 238, 248, 250 protruding substantially in the same orientation as they would were the regulator body drilled to provide openings and passages at which to make the port connections. Because it is not necessary to form the radially extending ports in the side of the regulator body, the regulator body 210 has a lower profile, i.e., protrudes less from the bonnet/case 204. In order to better protect the now-external inlet and outlet tubing and port assemblies, a guard plate assembly 260 is fabricated of three steel plates, as shown, and is secured by spot welding, for example to the two flats 262 provided on either side of the bottom planar surface 216 at the outer surface of regulator body 210.

Because the regulator of the present invention uses the external tubing and inlet and outlet tees, the fabrication of the lines into and out of the tees requires six welds to be made, as compared with having to make only four welds for inlet, outlet, inlet pressure gauge, and outlet pressure gauge lines when the connections are made directly to bores in the regulator body itself. However, this additional fabrication effort is vastly outweighed by the substantial elimination of any polishing procedures for the regulator body, the ability to use substantially off-the-shelf fittings and components, and the simplification of the configuration of the regulator body itself, and the design flexibility provided by the overall design approach.

What is claimed is:

1. A gas flow control device for use in handling high purity or highly corrosive gases, comprising:

a body having inlet and outlet bores extending therein;

an outlet sleeve having a highly polished inner surface, said outlet sleeve being substantially permanently secured within said outlet bore;

an inlet sleeve having a highly polished inner surface, said inlet sleeve being substantially permanently secured with said inlet bore;

a first connector operatively coupled to said outlet sleeve for connecting an outlet line thereto; and a second connector operatively coupled to said inlet sleeve for connecting an inlet line thereto wherein said device is a pressure regulator, and wherein said body is a regulator body having said inlet and outlet bores extending therethrough from a bottom surface of said regulator body.

2. A gas flow control device as recited in claim 1 wherein said first connector is so constructed and arranged to have said outlet line and an outlet pressure gauge connected thereto, and said second connector is so constructed and arranged to have said inlet line and an inlet pressure gauge connected thereto.

3. A gas flow control device as recited in claim 2 wherein said first connector comprises a first tee junction box to which said outlet sleeve is connected, and to which an outlet line sleeve and an outlet pressure gauge sleeve are connected, and wherein all internal wetted surfaces of said outlet sleeve, said outlet line sleeve, said outlet pressure gauge sleeve, and said first tee junction box, are highly polished.

4. A gas flow control device as recited in claim 3 wherein said second connector comprises a second tee junction box to which said inlet sleeve is connected, and to which an inlet line sleeve and an inlet pressure gauge sleeve are connected, and wherein all internal wetted surfaces of said inlet sleeve, said inlet line sleeve, said inlet pressure gauge sleeve, and said second tee junction box, are highly polished.

5. A gas flow control device as recited in claim 2 wherein said regulator body is secured at an upper end thereof to a bonnet assembly comprising a bonnet case and a bonnet cap.

6. A gas flow control device as recited in claim 5 wherein said first connector is so constructed and arranged to have said outlet line and an outlet pressure gauge connected thereto, and said second connector is so constructed and arranged to have said inlet line and an inlet pressure gauge connected thereto.

7. A gas flow control device as recited in claim 6 wherein said first connector comprises a first tee junction box to which said outlet sleeve is connected, and to which an outlet line sleeve and an outlet pressure gauge sleeve are connected, and wherein all internal wetted surfaces of said outlet sleeve, said outlet line sleeve, said outlet pressure gauge sleeve, and said first tee junction box, are highly polished.

8. A gas flow control device as recited in claim 7 wherein said second connector comprises a second tee junction box to which said inlet sleeve is connected, and to which an inlet line sleeve and an inlet pressure gauge sleeve are connected, and wherein all internal wetted surfaces of said inlet sleeve, said inlet line sleeve, said inlet pressure gauge sleeve, and said second tee junction box, are highly polished.

9. A gas flow control device as recited in claim 8 wherein said inlet sleeve and said outlet sleeve are constructed of a material resistant to corrosion by high purity gases.

10. A gas flow control device as recited in claim 9 wherein said body is constructed of a material that is not resistant to corrosion by high purity gases.

11. A gas flow control device as recited in claim 1, wherein said inlet sleeve and said outlet sleeve are constructed of a material resistant to corrosion by high purity gases.

12. A gas flow control device as recited in claim 11 wherein said body is constructed of a material that is not resistant to corrosion by high purity gases.

* * * * *